Feb. 8, 1927.

H. B. MAKSABEDIAN

PROPELLING MECHANISM

Filed June 22, 1926

1,617,261

WITNESSES

INVENTOR
H. B. MAKSABEDIAN
BY
ATTORNEYS

Patented Feb. 8, 1927.

1,617,261

UNITED STATES PATENT OFFICE.

HARRY BAGHOS MAKSABEDIAN, OF KEENE, NEW HAMPSHIRE.

PROPELLING MECHANISM.

Application filed June 22, 1926. Serial No. 117,833.

This invention relates to propelling mechanisms, an object of the invention being to provide a propelling mechanism which may be used on land or in water and in connection with any sort of vehicle which may travel over the land or in the water.

A further object is to provide a propelling mechanism of this character which will climb and move over any obstruction, take any grade, move in any direction and travel over land and through the water.

With these and other objects in view, the invention consists in certain novel features of construction and combinations and arrangements of parts which will be more fully hereinafter described and pointed out in the claims.

In the accompanying drawings—

Figure 1:
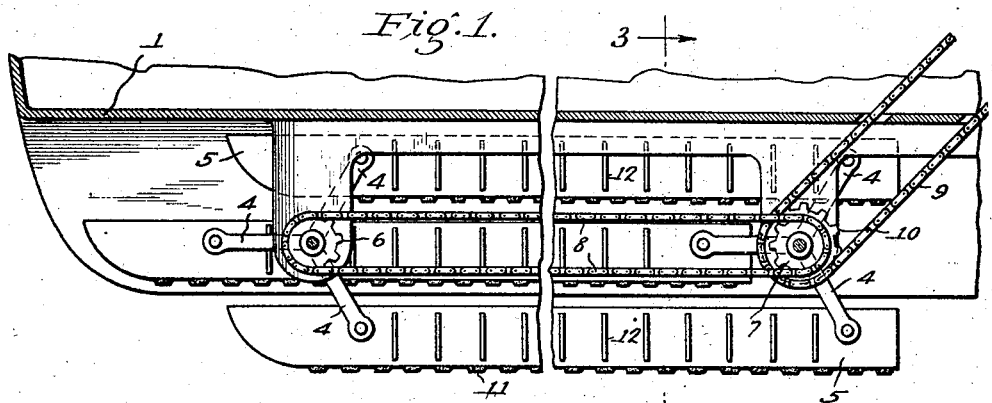
Figure 1 is a broken view in longitudinal section, illustrating my improved controlling mechanism in connection with a body supported thereby.
Figure 2:
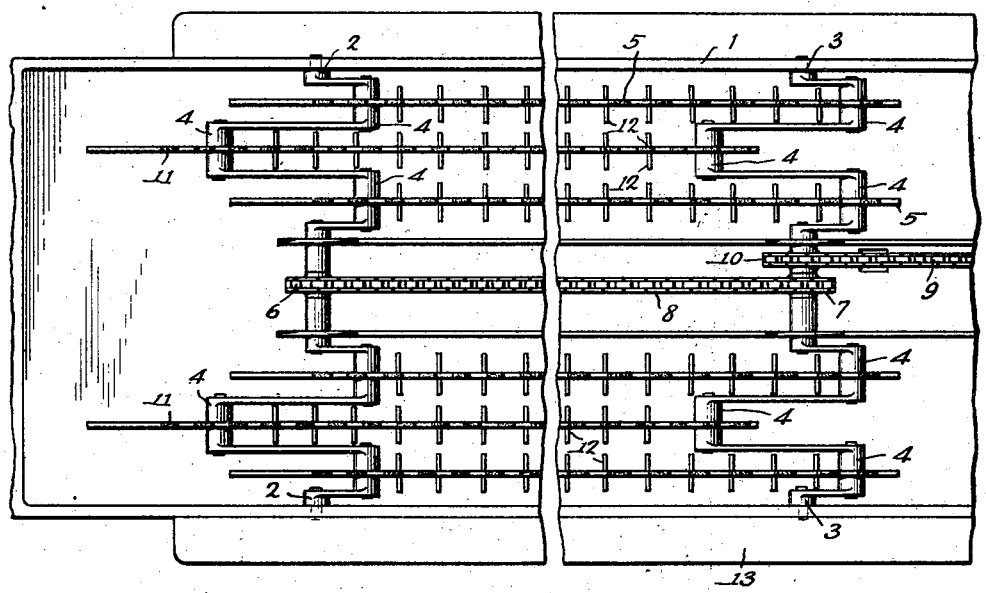
Figure 2 is an inverted plan view of Figure 1.

1 represents a body which is supported by my improved propelling mechanism, and it is assumed the body 1 may have any number of such propelling mechanisms, but I have illustrated only one of such mechanisms as the number employed will be entirely discretionary with the manufacturer and the user.

The body 1 provides rotary mounting for a pair of crank shafts 2 and 3 spaced apart the desired distance and extending transversely of the body. These crank shafts 2 and 3 are formed with crank arms 4, and I may employ any number of these crank arms spaced apart any desired degrees relative to each other, the only essential being that the crank arms of one shaft will be disposed and arranged in exact accordance with the crank arms of the other shaft so that they can be connected by bars 5.

These bars 5 may be of any desired length, width and thickness and are pivotally connected to alined crank arms on the respective shafts so that in operation they function like links which are mounted on the shafts and which turn with the shafts, the pivotal connections between the bars and the links turning in the arc of a circle.

The shafts 2 and 3 have sprocket wheels 6 and 7 thereon, respectively, connected by an endless sprocket chain 8, and a drive sprocket chain 9 engages a sprocket wheel 10 on shaft 3. This chain may be driven by any desired motor on the body 1.

The bars 5 are preferably formed with serrations 11 at their lower edges so as to give the desired traction to the bars, as it is to be understood that these bars when the vehicle is on the ground will support the vehicle and propel the same. The bars 5 are preferably formed with laterally projecting vanes 12 which function to propel the body when the latter is in the water.

In operation, when the device is moving over the ground, the lowermost bars 5 rest on the ground while the other bars move upwardly, then forwardly, and then downwardly, so that the sets of bars operate very much as do the feet of the human being in walking, each bar in regular succession sustaining the weight, and the next bar moving downwardly will engage any obstruction or take any grade and cause the vehicle to keep moving forwardly regardless of the irregularity of the surface. When the device is in the water the motion of the bars 5 will through the medium of the vanes 12 exert a propelling action and move the body forwardly.

Figure 3:
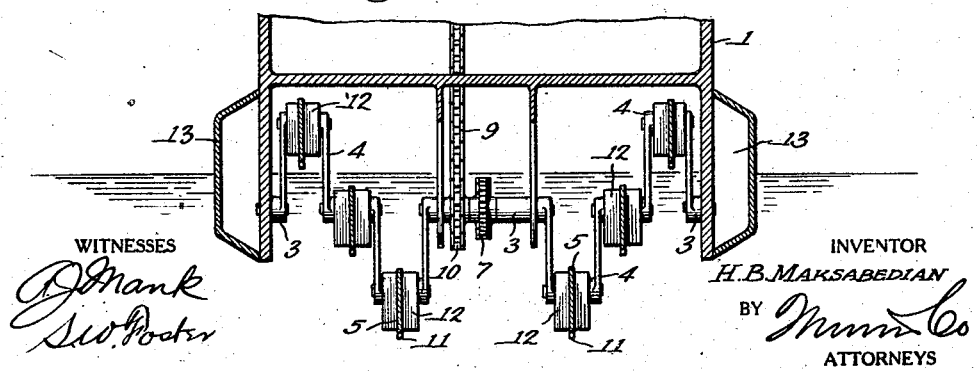
Figure 3 is a view in transverse section on the line 3—3 of Figure 1.

I have illustrated in Figure 3 air jackets 13 at opposite sides of the body 1 which will give the necessary buoyancy to this body and sustain the parts in proper position so that the bars 5 are only in the water during their downward and rearward movement.

It is this broad idea of a propelling mechanism for land or water, including a series of bars or analogus members operatively connected to crank shafts, which cause said bars to successively move forward and engage the ground or propel the body in water, which constitutes the broad idea of my invention, and while I have illustrated what I believe to be a preferred embodiment of my invention it is obvious that various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A propelling mechanism, comprising a body, a pair of crank shafts supported in the body, bars operatively connected to the crank arms of said shafts and adapted to engage the ground, and laterally projecting plates or vanes on the bars adapted to function as propellers when the device is in the water.

2. A propelling mechanism, comprising a body, a pair of crank shafts supported in the body, bars operatively connected to crank arms of said shafts and adapted to engage the ground, said connected crank arms arranged in pairs and spaced apart equal degrees whereby the bars engage the ground in regular succession, while other bars move forwardly and downwardly, and laterally projecting plates or vanes on the bars adapted to function as propellers when the device is in the water.

3. A propelling mechanism, including a pair of crank shafts, supports for the crank shafts, each crank shaft having a like number of spaced crank arms, bars pivotally connected to alined crank arms of the shafts, means for turning the shafts whereby the bars will successively engage the ground, the motion of said bars being forwardly, downwardly, rearwardly and upwardly in regular cycle and in regular succession, and laterally projecting plates or vanes on the bars adapted to function as propellers when the device is in the water.

4. A vehicle adapted for movement over land and through the water, comprising a body, crank shafts mounted in the body, bars connecting the crank shafts, vanes on the bars, and means for imparting motion to the crank shafts whereby the blades are successively moved into a plane below the bottom of the body and in a rearward direction.

HARRY BAGHOS MAKSABEDIAN.